M. S. McMEEKEN.
COMBINED TRACK AND SWITCH MECHANISM.
APPLICATION FILED SEPT. 24, 1918.

1,296,989.

Patented Mar. 11, 1919.
2 SHEETS—SHEET 1.

Witness

Inventor
Milo Simpson McMeeken

By
Attorney

M. S. McMEEKEN.
COMBINED TRACK AND SWITCH MECHANISM.
APPLICATION FILED SEPT. 24, 1918.
1,296,989.
Patented Mar. 11, 1919.
2 SHEETS—SHEET 2.
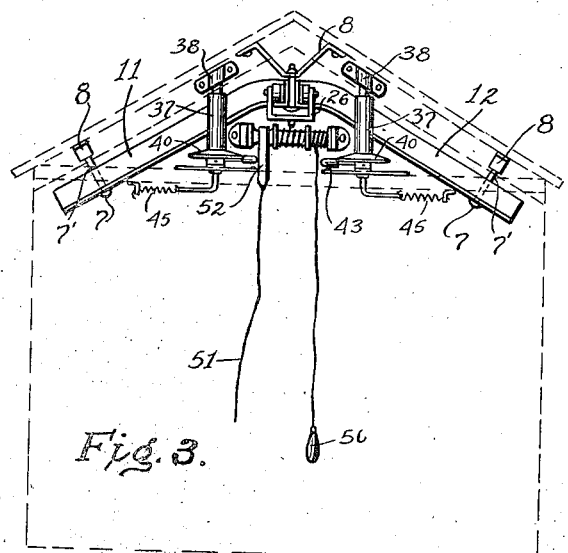
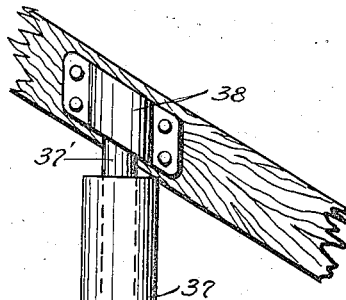
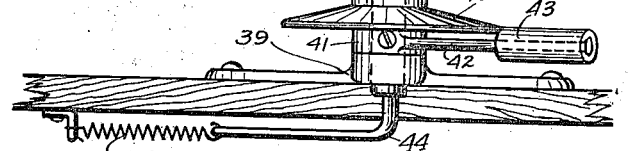
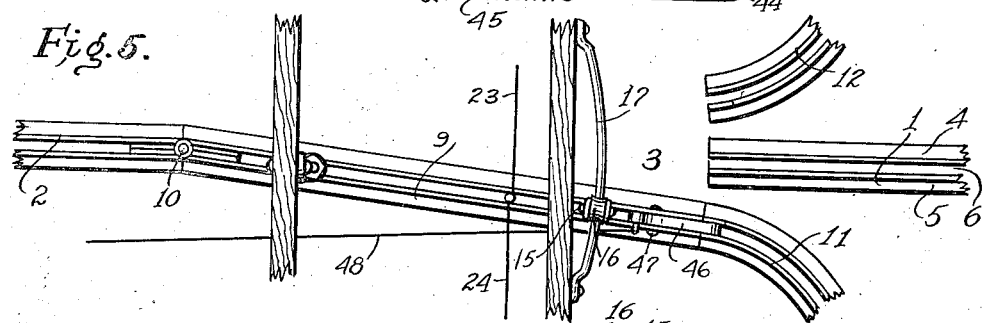
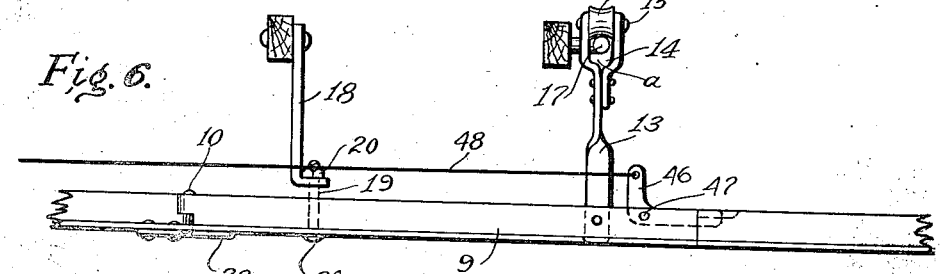

UNITED STATES PATENT OFFICE.

MILO SIMPSON McMEEKEN, OF MANSFIELD, OHIO.

COMBINED TRACK AND SWITCH MECHANISM.

1,296,989.         Specification of Letters Patent.     Patented Mar. 11, 1919.

Application filed September 24, 1918. Serial No. 255,499.

*To all whom it may concern:*

Be it known that I, MILO SIMPSON MC-MEEKEN, a citizen of the United States of America, residing at Mansfield, in the county of Richland and State of Ohio, have invented certain new and useful Improvements in Combined Tracks and Switch Mechanism, of which the following is a specification.

This invention relates to a combined track and switch mechanism for use in the mow of a barn or the like.

It is well known to those who are familiar with piling, distributing and storing away grain, hay and other products or material in the mows of a barn or the like that difficulties are encountered in distributing said products and material in the mow especially to deposit same equally in the portions of the mow that are located on either side or remote from the center of the mow of the barn or the like.

The conventional means of conveying and distributing and storing away hay, grain and the like in a mow consists of a track and a car with means of carrying a conveyer truck. The track is ordinarily attached to the roof of the barn at the center thereof, and when the conveyer is emptied of its contents or hay grapple released, the hay, grain and other products or material are deposited in a pile in the center of the mow only, although it should be distributed equally on each side of the mow to obtain the full capacity of the mow. This operation involves considerable extra labor, time and difficulty in distributing same by hand manipulation.

The primary object of the present invention consists in overcoming the above described objections by applying a switch mechanism to the main track in such a manner as to switch the conveyer truck from the main track to switch tracks which latter can be located on one, or both sides of the center of the mow running across each side and preferably arranged to conform with the incline of the roof of the barn or the like, when the barn is provided with an ordinary pitch roof.

A further object is to provide means of controlling the truck in its travel on the switch track at the will of the operator, and of forcing the truck to travel on either switch at the will of the operator so that the contents of the conveyer, carrier or other receptacle can be emptied in the center or on either side of the mow and equally distributed thereon.

Further objects are to provide means of hinging a member to a section of the main track and supporting same in such a manner as to permit the truck to be switched and directed to travel over a switch track located on either side of the mow and controlling same through the medium of cables or the like which can be manipulated at a point remote from the truck, carrier, grapple or other receptacle, and further to provide means of attaching a cable or the like to the truck to control the travel of the truck no matter whether it is being operated for distributing the hay, grain and the like in the mow or being returned to its normal position preparatory to reloading the carrier, grapple or other receptacle.

Further objects consist in providing means for guiding the cable for a direct pull on the truck and maintaining the cable in contact with the pulley or the guiding means, and further to provide a brake mechanism for regulating and controlling the travel of the truck through the medium of a cable which is also provided with means for winding the cable automatically and returning the truck to its normal position for reloading the conveyer, grapple or other receptacle.

These and other objects are illustrated by the mechanism shown in the accompanying drawing in which:—

Fig. 3 is an end view of Fig. 1.

Fig. 4 is an enlarged detail view of one of the rollers of the cable guiding means.

Fig. 5 is a plan view showing portions of the main track spaced apart, a switch track member pivotally connected to one portion of the main track, means for carrying the weight of the switch member, a locking means, and fragments of two conventional switches located on each side of the main track.

Fig. 6 is a side elevation of Fig. 5.

Figure 1:
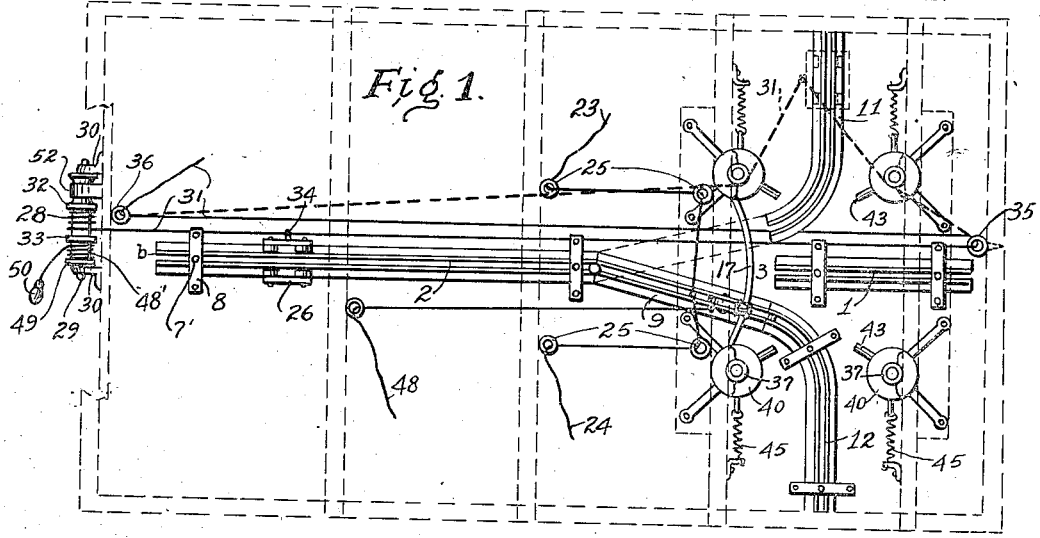
Figure 1 is a plan view of the invention showing its application to the frame work of a barn.

In describing the construction, assembly and installation of the invention portions of a main track which are indicated by reference numerals 1 and 2 are spaced apart leaving a predetermined gap 3 between the alined ends of each portion as clearly shown in Fig. 5. The main track is preferably constructed of two angle irons 4 and 5 which are supported in spaced relation to each other as shown at 6. The track is suspended and supported from the roof of a barn or the like by the heads 7 of the bolts 7' which pass between the angle irons through the space 6 and are connected to the hangers 8. The hangers 8 can be fastened to the roof or frame-work of the barn in any conventional manner preferably at the points and in the manner shown.

A switch track member 9 corresponding and coinciding with the main track portion 2 is pivoted or hinged to the portion 2 of the main track by a pin 10. The switch track member is made of such size, form and dimensions as to bridge the gap 3 and aline with the portions 1 and 2 of the main track. Switch tracks 11 and 12 are arranged and located at predetermined points on each side of the main track portion 1 and preferably hung from the roof of the barn (to correspond with the pitch thereof) by the hangers 8. The ends of the switch tracks 11 and 12 which lie and are supported adjacent to, but in spaced side relation to portion 1 of the main track, are alined with the end of portion 1 and preferably curved or bent so as to position the switch tracks substantially at right angles with the main track extending laterally from each side of the main track across the mow of the barn. To support the weight of the free end of the switch member 9 and permit it to swing or pivot on the pin 10 without excessive friction on a plane and to aline with either of the switches or the main track a hanger 13 is fastened to the free end of the switch member and provided with a bifurcated end 14.

A pin 15 is secured to the bifurcated portions adjacent to its extremity and a roller 16 journaled thereon so as to leave a space (a) beneath the roller to receive a track 17 upon which the roller 16 is adapted to travel and support the free end portion of the switch member.

In order to further reduce the friction incident to swinging the switch member 9 upon its pivot if desired an auxiliary hanger 18 can be utilized, one end being pivotally attached to a beam or roof of the barn and the opposite end formed L shape and apertured to receive the projecting end of a bolt 19 provided with a nut 20 and a head 21 which assist in supporting the switch member 9. A plate 22 can also be used to provide a base for the pivoted end of the switch member to swing upon. The plate 22, hanger 13 and auxiliary hanger 18 can be dispensed with if desired without materially affecting the operation of the switch member, these elements however, add materially to the efficiency of its operation.

To provide means of moving the switch member to intersect and line with the main track or one of the switches located on either side of the main track, cables 23 and 24 or the like are attached to the switch member and the free end of each is passed through (in opposite directions) a series of screw eyes 25 to any convenient point desired for manipulation by the operator. A carrier truck 26 is mounted to travel on the main track and a hay grapple 27 or other carrier or receptacle is secured thereto in any well known manner. A cable drum 28 is mounted on a shaft 29, which in turn is journaled in brackets 30 secured to the barn or other frame-works preferably at a point adjacent to the end b of the main track. One end of a cable 31 is wound upon and around the drum the number of times desired at one end of the drum between the collars 32 and 33. The cable 31 is then attached to a pin 34 which is secured to the truck 26; thence it is passed through the screw eye 35 looped and carried back parallel with the portion attached to the drum and then passed through the screw eye 36 as clearly shown in Fig. 1. In order to provide means of exerting substantially a direct pull upon the truck 26 when it is diverted from the main track to travel on either of the switch tracks guiding pulleys or rollers 37 are provided and journaled upon a shaft 37'. The rollers are spaced apart in predetermined positions. The shaft 37' is journaled in bearings formed in the brackets 38 and 39. The rollers are arranged and located so as to engage and direct the transmission of that portion of the cable 31 that is required to permit the truck to travel to the terminal of either switch and at the same time provide for substantially a direct pull upon the truck (see Fig. 1 dotted lines showing cable). The rollers 37 are preferably provided with tapered flanges 40 which serve to support and maintain the cable and direct it to and keep it from dropping away from the rollers.

To further provide against the liability of the cable (when it is more or less slack) from falling or dropping away from the guiding rollers 37, when the truck is being returned to its normal position, a collar 41 is secured to the shaft 37' and provided with an arm 42 which extends beyond the periphery of the flange 40. A roller 43 is rotatably mounted upon the arm with one end contacting with the periphery of the flange 40 thereby making a continuous path to direct the cable in contact with the roller and support same. As the roller and arm project in close proximity to the truck when it is traveling to the switch terminals, provision is made to permit the arm 42 to yield if the roller 43 or arm encounters an obstruction (such as contacting with the load of the grapple, carrier or the like). To accomplish this an L shaped arm 44 is provided on the shaft 37' and connected to a coil spring 45 which exerts its tension to maintain the arm 42 in a predetermined position, but allows the arm to yield in either direction when subjected to pressure or obstruction.

Figure 2:
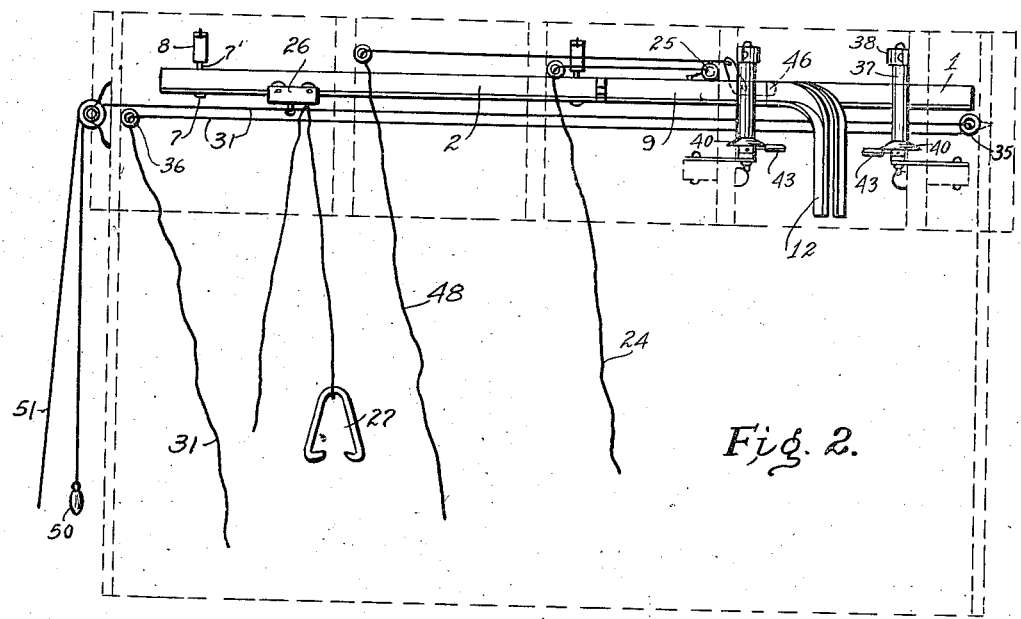
Fig. 2 is a side elevation of Fig. 1.

The operation of the switch mechanism is as follows: When the truck is in its normal position as shown in Figs. 1 and 2 the hay grapple, carrier or other receptacle is loaded in the ordinary manner. The operator grasps the free end of the cable 31 and pulls same, the truck being attached to the cable it is forced to travel on the main track to its terminal provided it is not switched or directed to either of the switch tracks by the manipulation of the switch member 9. If the operator desires to divert the travel of the truck from the main track to one of the switch tracks prior to the truck reaching in its travel the pivoted end of the switch member, the operator pulls either of the cables 23 or 24 according to the particular switch he desires the truck to travel upon and the truck is then diverted to travel on the switch track desired.

When the truck reaches and is drawn slightly over the pivoted end of the switch member the gravity or weight of the truck forces it to travel upon and over the switch under normal conditions until it reaches its terminal. In order to securely maintain the switch member in alinement with the main track or either of the switch tracks, a bell crank locking member 46 is fastened between the parts of the switch member upon a pin 47, having one end of the locking member overlapping the abutting end of the main track and adapted to be received in the space 6 between the parts of the main track, thereby securely locking and preventing lateral movement of the switch member. The bell crank 46 is rocked upon the pin to unlock the switch member from and to the main track by manipulating the cable 48. To automatically return the truck to its normal position on the main track preparatory to reloading the carrier or grapple a cable or rope 48' is wound around the drum 28 between collars 33 and 49 in an opposite direction to cable 31. The purpose of winding the cables 31 and 48' on the drum 28 in opposite direction is to permit one cable to wind up on the drum as the other is being unwound. A weight 50 is fastened to the free end of the cable 48' and when the carrier which is secured to the truck is emptied of its contents or the grapple released the gravity of the weight 50 rotates the drum 28, taking up all slack in the cable 31 and winding it upon the drum 28 and at the same time exerting power to return the truck to its normal position on the main track. When the truck is traveling on any portion of the switch tracks and it is desired to hold or manipulate it at a predetermined point on the switch track the operator manipulates the cable 51 (which is attached to a friction brake 52 of an ordinary type) to prevent the drum 28 from rotating or to permit same to rotate as desired, thereby holding the truck at a predetermined point of its travel on either switch or main track as desired or to permit it to travel to another position on the switch track. It will be apparent that a plurality of switch members can be applied to the main track if desired and one or more switches used on either or both sides of the main track without deviating from the principle of the invention; hence the invention is not intended to be confined or limited to the construction, form or assembly shown in the drawing.

It will be noted that the entire apparatus can be operated from one point by one man thereby saving in man power and efficiency in operation.

I claim:—

1. A trackway having a main track section, branch track sections, a switch for connecting the main track section to any one of the branch track sections, said switch being pivotally connected to the main track section, a hanger for the pivoted end of the switch comprising a portion pivotally connected to a support, and a hanger for the free end of the switch including a track-bar secured to a support, and a hanger-bar connected to the switch and adapted to travel on said track-bar.

2. A trackway having divergent portions, a switch for connecting either of said portions with the main trackway, a body for travel on the trackway, cable means to impart movement to said body, and guides for the cable on said divergent track portions, said guides comprising pulley sections having tapered enlarged base portions to keep the cable in coöperation with the pulleys when not under tension.

3. A trackway having switch portions, a body for travel on the trackway, cable means to impart movement to said body, guide pulleys having widened tapered bases, and an arm mounted for rotation on the pulley center and extended beyond the edge of and in line with the surface of the tapered base.

4. A trackway having switch portions, a body for travel on said trackway, cable means to impart movement to the body, guide pulleys for the cable, and an arm swingingly mounted on the pulley center to prevent the cable leaving the pulley, said arm being yieldingly held in a predetermined relation to the pulley.

5. A trackway having switch portions, a body for travel on said trackway, cable means to impart movement to the body, guiding means for the cable including guide pulleys having widened bases, and arms mounted for swinging movement in the plane of the pulley bases, and springs for returning the arms to normal positions following their swinging movement.

6. A trackway having a main section and divergent sections, a switch for connecting the main section with either of the divergent sections, auxiliary means to movably support the free end of the switch, the trackway comprising angle strips with the upright portions in spaced parallel relation, and a locking lever mounted at the free end of the switch and adapted to engage between the uprights of the trackway of the divergent sections to lock the switch with relation to a particular divergent section.

In testimony whereof I affix my signature.

MILO SIMPSON McMEEKEN.